Patented Apr. 19, 1949

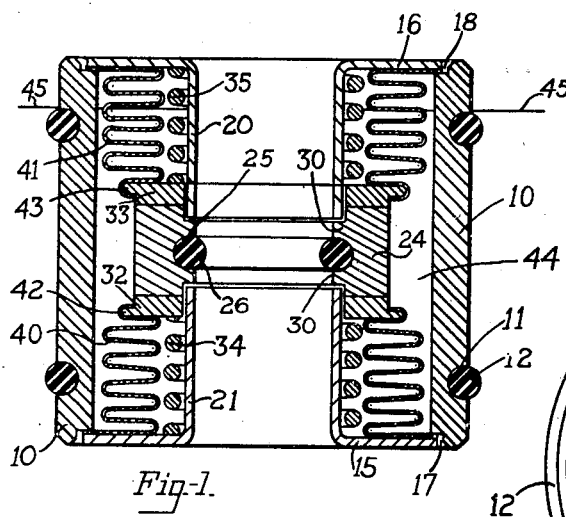

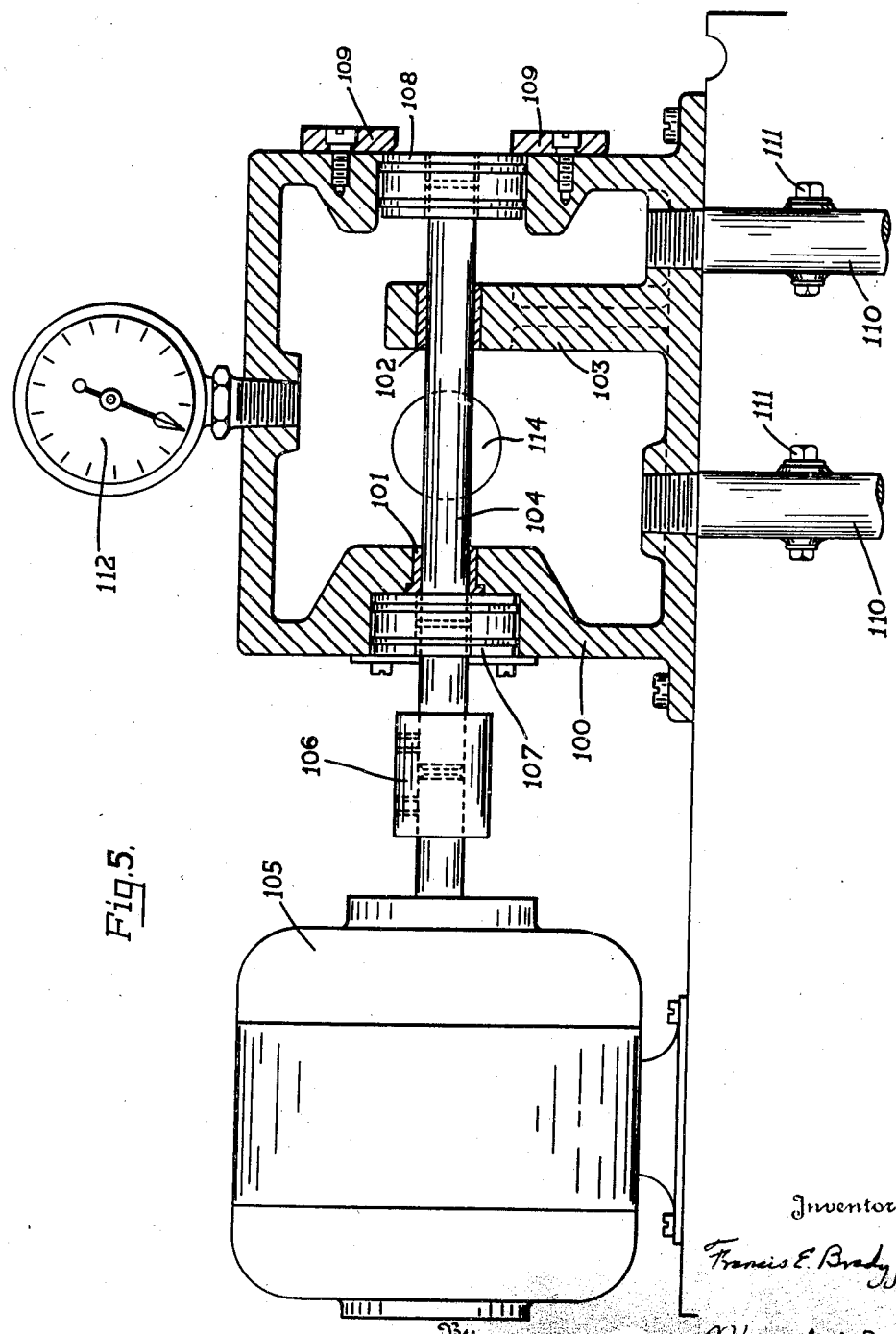

2,467,960

UNITED STATES PATENT OFFICE 2,467,960

SEALING UNIT

Francis E. Brady, Jr., Muncie, Ind.

Application July 13, 1944, Serial No. 544,678

2 Claims. (Cl. 286—11)

This invention relates to seals and more particularly to sealing units for application to a rotary shaft.

It is the principal object of the invention to provide a prelubricated sealing unit for a shaft or the like which is constructed as a completely closed and sealed assembly capable of being applied to the shaft in operative position thereon as a unit and incorporating a quantity of lubricant which is available for supply to the running sealing surfaces throughout the useful life of the unit.

It is a further object to provide such a unit which may be completely assembled and tested as a part of its manufacture, and which may be then shipped as an assembled unit, and mounted upon a shaft with the assurance that it will remain effective as a pressure-tight seal throughout its use.

It is also an object to provide a prelubricated and pretested sealing unit which may be readily inserted in operative position as a unit, which will establish pressure-tight sealing relations capable of being maintained notwithstanding inaccuracies in alignment or eccentricities of the shaft, and which contains its own body of lubricant for supply to the running sealing surfaces to maintain a highly effective seal condition without further attention throughout the entire life of the unit.

It is a further object to provide a means for pretesting an assembled sealing unit under actual running conditions comparable to or more severe than those to which it is to be subjected in use, the tested unit being then handled as an assembled unit and without further disassembly of the parts, maintaining a completely closed and sealed condition at all times.

Other objects and advantages will be apparent from the following description, the accompanying drawing and the appended claims.

In the drawing,

Fig. 1 is a sectional view through an assembled sealing unit constructed in accordance with the present invention showing the position in which the unit is mounted for assembly and prior to its application to a shaft;

Fig. 2 is an end elevational view of the unit;

Fig. 3 is a sectional view through a unit in operative position on a shaft, certain parts of the unit being of modified construction;

Fig. 4 is a sectional view through a modified form of sealing unit more particularly adapted for low pressure sealing purposes; and Fig. 5 is a view partially in elevation and partially in section showing a device for subjecting the finished and assembled sealing units to a pretesting operation under actual running conditions.

In the manufacture of seals or sealing units, it is found that a high degree of care must be exercised not only in the construction of the parts which make up the unit but also in their assembly, in order to make certain that the unit in its final assembled position is clean and free of dirt or other foreign matter which would impair the close running sealed condition which is necessary for proper operation. Where parts are manufactured and then assembled in operative position by the user, it is frequently found that the surfaces may be scratched or particles of dirt may find their way into the interior of the seal, the most minute particles of such matter frequently resulting in failure of the running sealing surfaces to form an actual seal. Under such conditions even a high degree of accuracy and care used in the production of the parts becomes of little or no value since the accuracy of the running surfaces is impaired by the conditions encountered during assembly of the parts.

It is highly desirable that a body of lubricant be available which can be enclosed in the unit and maintained therein under running conditions and throughout the full period of life of the unit. In this way the running sealing surfaces are supplied with a continuous film of suitable fluid without the necessity of any attention being given to the unit during its operation, and without the possibility of access to the unit of dirt and foreign matter which would accompany the periodic lubrication thereof. Similarly it is highly important in many cases that the lubricant be confined to its own reservoir chamber and that it be prevented from leakage along the shaft where it might prove injurious such for example as in the case where the shaft operates a pump handling a liquid foodstuff.

In accordance with the present invention, therefore, a sealing unit is provided which not only is preassembled so that it can be applied to its operative position as a unit, but it is so constructed as to incorporate within its self its own permanent supply of lubricant, that supply being maintained without appreciable loss or leakage such that it maintains a proper lubricated condition at the running sealing surfaces and without entailing the necessity of securing access to the interior of the sealing, and hence avoiding possibility of dirt finding its way into the seal to impair the smoothness and accuracy of contact of the running surfaces.

With such construction of sealing unit, it is possible to subject each assembled and prelubricated unit to a pretesting operation, under actual running conditions, and under speeds and pressures which may either simulate those to which the seal is to be subjected, or may be made substantially more severe than those conditions. If the test shows the unit to successfully seal the shaft under the running conditions, it may then be removed and shipped, still as an assembled unit, with assurance that in the final use it will also provide proper sealing conditions. This makes it practicable to guarantee the performance of the seal, since there is no handling of the individual parts, and no access provided to the interior of the unit after it has been successfully tested.

Referring to the drawing which discloses a preferred embodiment of the invention, Fig. 1 shows a form of sealing unit which is symmetrical and which is adapted for the sealing of different fluids and a wide range of pressures. It is adapted to be mounted on the shaft with either end toward the pressure side of the fluid which it is desired to seal. It comprises a hollow outer casing 10 in the form of a cylindrical sleeve of steel or other suitable material, the outer periphery of which is grooved at one or more points to provide recesses 11 for receiving annular grommets 12 of rubber or other similar yieldable material which are held in place by their own resiliency. The outer surfaces of such grommets are adapted to engage the wall surface of the opening in which the seal is mounted, under sufficient pressure to properly and securely support the unit in place, preferably leaving it possible to remove the same therefrom when desired. The grommets effectively sealing the casing to the wall opening forming a pressure-tight connection therewith and securely holding the casing in relatively fixed relation with respect to the wall opening.

Annular collars 15 and 16 extend outwardly toward notches 17 and 18 respectively in the inner periphery of the casing 10, being suitably brazed or soldered in position therein to form a completely closed and sealed joint. The collars are formed with neck portions 20 and 21 which extend inwardly toward but spaced from each other, such neck portions having an internal diameter larger than the shaft on which the unit is mounted, in order to provide clearance with respect thereto.

A sealing member 24 is located centrally of the unit, such member also having an internal diameter greater than that of the shaft upon which it is to be used. The inner periphery of the sealing member is recessed as shown at 25, providing for receiving a yieldable grommet 26 therein which is adapted to slide over and closely and securely engage the shaft in pressure-tight relation when the unit is mounted thereon, the sealing member being thereby held in fixed relation to the shaft so that in most cases where the shaft rotates in the wall, the member 24 will rotate with it. By using grommets which are approximately circular in cross-section, the yieldable rubber or like material is subjected to compression and is caused to actually flow when the unit is in place, thus creating a relatively high pressure which effectively seals the grommet with respect to the surface with which it is in contact. Where it is desired to provide for removal of the unit, the grommets may be wetted with a liquid which will facilitate this action, a suitable liquid for this purpose being glycerin. While the unit can be readily withdrawn within a short time after it is mounted in position, it is found that after a sufficient period of time for the fluid to have disappeared or changed its characteristics, the unit is very securely held in position against any normal pressure condition which may be encountered therein.

Sealing member 24 has inwardly extending shoulder portions 30 which overlap with the respective adjacent end portions of necks 20 and 21, suitable clearance being provided for the normal running condition. Because of this overlapping relationship, it will be evident that sealing member 24 is held in proper relation with respect to the casing, being substantially centered therein, so that it cannot become displaced when the unit is shipped, and while it is being mounted on the shaft, being properly guided and centered in this manner.

Member 24 is provided with highly smooth running sealing surfaces at its opposite sides, and a pair of sealing rings 32 and 33 are provided for engaging such opposite faces at spaced positions with respect to the sealing member itself. Each of the rings 32 and 33 has clearance over the neck portions 20 and 21, respectively, and are yieldably urged into sealing relation with member 24 by means of springs 34 and 35 respectively, the ends of which bear against the respective collars 15 and 16.

Either sealing member 24 or rings 32 and 33 are made of a material which is porous to and can be penetrated by the lubricant which it is desired to supply to the running surfaces, the material of the cooperating part or parts being of either carbon or a nitrided steel which is hard but not brittle and which can also be formed with a highly smooth running surface. Preferably sealing member 24 is formed of the carbon or Nitralloy steel, while sealing rings 32 and 33 are formed of a porous material such as a sintered body of powdered metal, either ferrous or non-ferrous, through which the lubricant can pass to the running sealing surfaces. Such running surfaces on all three parts are formed with great accuracy to be highly smooth and flat, and great care is utilized throughout the manufacturing operation to exclude all dust and dirt and foreign particles which might impair the close running seal desired at these surfaces.

Means are provided for forming a closed chamber or reservoir within the casing for the retention of the desired quantity of lubricant, such means being of a yieldable or flexible character for connection to the sealing rings so that they are respectively left free to assume the proper position for most satisfactory sealing engagement during running. For this purpose flexible bellows 40 and 41 are provided which may be of metal or other suitable material such as leather, rubber, or the like, one end thereof being secured to the flange portions 42 and 43 of the sealing rings in suitable manner as by brazing or soldering in the case of metal and by other fastening means in the case of leather or other material not capable of being soldered. The outer end of the bellows seats against the respective collars 15 and 16, and preferably is also received within the notched portions 17 and 18 so that it will be securely held in proper relation to prevent any escape of lubricant at these points. A substantially annular shaped reservoir chamber 44 is thus defined outwardly of the bellows and inwardly of the inner wall of the hollow casing 10.

The unit is assembled in the position shown in Fig. 1, beginning with the lower collar 15 which is first soldered to the casing 10, bellows 40 having previously been attached to flange 42. Sealing member 24 is then mounted in position together with ring 33 and bellows 41, the upper end of which however is not yet attached to casing 10, leaving an opening at the upper end of the casing. Into the annular chamber 44 there is then supplied the proper quantity of lubricant which may be filled up to approximately the level indicated by line 45. Thereafter collar 16 is moved into position and the end of bellows 41 and the outer periphery of the collar are brazed or soldered into the notch 18, thus completing the closing and sealing of the unit.

Fig. 3 shows a unit in position upon shaft 50 and within an opening in wall 51. Parts similar to those shown and described in connection with Fig. 1 are similarly numbered, this figure showing modified construction of the cooperating sealing elements. Thus as shown the sealing member 55 is not provided with shoulder portions, but is guided and centered prior to its assembly upon the shaft through the provision of flanged portions 56 and 57 formed respectively upon the two sealing rings 58 and 59. Preferably the flanges are undercut as shown at 60 and 61 to avoid the necessity for establishing highly accurate running surfaces, and to allow freedom of movement of the sealing member 55 when in position on the shaft.

Also as shown in Fig. 3 the sealing rings may be provided with one or more passages 62 and 63 which lead directly from the reservoir chamber into the running sealing surfaces. In this way the lubricant is positively supplied directly to the sealing surfaces, and with this construction the sealing rings may be made of a material impervious to the passage of lubricant while still assuring the supply thereof to the proper areas.

Fig. 4 shows a further modified construction which is more particularly adapted for application to a shaft for low pressure sealing conditions, such as in the case of an automobile transmission, or the like. In this construction the outer casing is shown at 70 being recessed to receive grommets 71 which engage against the surface of the wall 72 in the opening in which the seal is mounted. Also in this form the casing preferably has an end wall portion 73 which extends inwardly toward the shaft with suitable clearance thereon.

Sealing member 75 is internally recessed to receive grommet 76 therein which yieldably engages and forms a pressure-tight connection when the seal is mounted on shaft 77. The sealing ring 80 has clearance with respect to the shaft and bears against one face of the member 75, being urged toward that face by spring 81 working against the collar 82. A flexible bellows 84, which may be conveniently formed of a piece of rubber, leather, or the like, is held in position in a recess on the outer periphery of ring 80 by means of garter spring 85. Its opposite end is received in a recess 86 in the inner face of the hollow casing member 70, and is held therein under compression to make it tight, together with the outer portion of collar 82 through the provision of a snap ring 87.

A second sealing ring 90 is provided for engaging the face of sealing member 75 in spaced relation with respect to sealing ring 80, member 90 preferably being a heavy felt washer which is normally too large to be received within the casing, but which is forced into position where it engages against the sealing member 75, while being supported laterally by the end wall 73 of the casing. It may also be held in place by means of a snap ring 91 seating within a recess in the inner surface of casing 70. The parts thus described form a reservoir chamber 93 which receives the supply of lubricant, the two sealing rings preventing escape of lubricant from the reservoir, while assuring that an adequate supply of the same will be furnished to the running sealing surfaces.

The lubricant which is supplied to the reservoir chambers as described above may be of suitable characteristics as desired for the particular type of unit and its application. Thus the lubricant may comprise one which is miscible within the fluid under pressure with which the seal is used. For example in the provision of a seal for water pressure, the lubricant may be a material which embodies an oil carred in emulsified form in water suspension, such that it will mix and be miscible with the water. In the event that the seal develops a tendency to leak, the water will then flow past the running sealing surfaces, and enter the reservoir chamber where it will build up a pressure which will displace lubricant. However the only escape for the lubricant will be the same path through which the fluid entered, and in traversing this path, the lubricant will provide for lubricating the surfaces, and thus overcome the condition which originally gave rise to the leakage. Since this operation necessarily occurs promptly and immediately upon the occurrence of any leakage, it provides for directing lubricant to any particular area where it is required, that lubricant being supplied prior to the occurrenc of such wear as to impair the actual surfaces themselves. As a result, a highly satisfactory operation is maintained and in most cases the leakage is checked as soon as it occurs and the condition which gave rise to the leakage is eliminated.

The construction of the present seal is further highly advantageous since it provides for maintaining an effective sealed condition notwithstanding substantial displacement of the center of the shaft relative to that of the wall opening, or misalignment, lack of parallelism, or eccentricity of the shaft. The outer casing is yieldably supported in the wall opening and the rotating sealing member is similarly supported in yielding relation upon the shaft, such yielding supports enabling each of the respective parts properly to seat itself upon its supporting member. The clearance provided as above described makes it possible for the rotating sealing member to be displaced a substantial distance from its normal position centrally of the casing, the sealing rings being supported in relatively free relation with respect to the casing so that under the spring pressure exerted upon them they follow the position of and align themselves with the sealing member to maintain continuous sealing relation with this member at all times and throughout all its movements.

In order to provide for the pretesting of the completely assembled sealing units, means are provided forming a pressure test chamber. For this purpose a housing 100 is provided which has a hollow interior, and which contains bearings 101 and 102, the latter being mounted in web 103, and providing for the journaling of a rotary shaft 104 therein. The shaft may be coupled to variable speed drive motor 105 by a coupling 106. The chamber is sealed at one end by means of a rotary seal 107 which is preferably permanently mounted in place, the seal under test being mounted at the opposite end, as indicated at 108. It is removably retained in place by the provision of a number of quick opening clamps 109 so that it can be quickly positioned on the end of shaft 104, and locked in place for the test operation, and also quickly removed therefrom. One or more supply and exhaust lines 110 having control valves 111 therein are provided for supplying fluid under pressure to the interior of the chamber. A suitable indicating gage 112 shows the pressure established within the chamber.

In operation, a test unit 108 is received over the shaft and within the wall opening in the casing, being quickly clamped in place by clamps 109. Fluid pressure, preferably hydraulic, is supplied through lines 110 while the shaft is rotated, and the unit is subjected to the desired test conditions. These conditions as to pressure and speed of rotation may be controlled as desired, and may be substantially the same as those for which the seal is designed, or may be made substantially more severe. If the seal is defective, it will show leakage almost immediately, particularly under more severe test conditions. However if the seal remains tight after a suitable period of running, it may then be removed and shipped out as a finished, pretested, and prelubricated sealing unit the performance of which in use can be reliably guaranteed.

To facilitate the removal of the sealing unit from the test position, clamps 109 are released, and additional fluid pressure is supplied, such as air pressure from pipe 114. If the grommets on the test unit are previously lubricated with glycerin or the like, it will be found that the unit can be withdrawn in this way with a relatively small air pressure. Alternately, magnetic means may be provided for drawing the unit out of the test position, or suitable linkage may be provided for mechanically forcing it out of position. After being tested the unit remains closed and sealed, the parts thereof being properly centered and guided throughout shipment and assembly into the final position of use, with the unit containing its own adequate supply of lubricant which will maintain the proper running conditions throughout the life of the unit.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A self-contained prefabricated and pretested sealing unit for unit mounting about a shaft within a bearing pocket and in sealing relation thereto to permit relative rotation therebetween comprising an elongated cylindrical casing having spaced annular grooves formed about its periphery, a rubber grommet mounted in each of said grooves for sealing contact with said pocket, inwardly spaced cylindrical neck portions secured to said casing at each end thereof, a centrally disposed sealing member mounted between the inner spaced ends of said neck portions having an inner annular groove therein, a rubber grommet mounted in said groove for yielding and sealing engagement about the surface of the shaft, an annular sealing ring mounted for running sealing contact with each end of said sealing member, a compression spring interposed between each sealing ring and an end of the said casing, and a flexible bellows connected with each sealing ring and the adjacent end of said casing for sealing off a lubricant chamber surrounding said sealing member and rings to retain a charge of lubricant and permit access thereto to the running sealing surfaces between said member and rings.

2. A self-contained prefabricated and pretested sealing unit for unit mounting about a shaft within a bearing pocket and in sealing relation thereto to permit relative rotation therebetween comprising an elongated cylindrical casing having spaced annular grooves formed about its periphery, a rubber grommet mounted in each of said grooves for sealing contact with said pocket, inwardly spaced cylindrical neck portions secured to said casing at each end thereof, a centrally disposed sealing member mounted between the inner spaced ends of said neck portions having an inner annular groove therein, a rubber grommet mounted in said groove for yielding and sealing engagement about the surface of the shaft, an annular sealing ring mounted for running sealing contact with each end of said sealing member, each of said sealing rings having a lubricant passage extending from the periphery thereof to the sealing surface, a compression spring interposed between each sealing ring and an end of the said casing, and a flexible diaphragm connected with each sealing ring and the adjacent end of said casing for sealing off a lubricant chamber surrounding said sealing member and rings to retain a charge of lubricant and permit access thereto to the running sealing surfaces between said member and rings.

FRANCIS E. BRADY, Jr.

REFERENCES CITED

The following references are of record in the file of this patent:

UNITED STATES PATENTS

| Number | Name | Date |
|---|---|---|
| 1,294,620 | Clarke | Feb. 18, 1919 |
| 1,366,879 | Dennedy | Jan. 25, 1921 |
| 1,617,549 | Schramm | Feb. 15, 1927 |
| 1,675,802 | Hamilton | July 3, 1928 |
| 1,789,978 | Hull | Jan. 27, 1931 |
| 1,992,790 | Victor et al. | Feb. 26, 1935 |
| 2,000,341 | Larsh | May 7, 1935 |
| 2,017,425 | Wheeler | Oct. 15, 1935 |
| 2,320,708 | Yost | June 1, 1943 |
| 2,342,955 | Meyer | Feb. 29, 1944 |
| 2,382,960 | Compton et al. | Aug. 21, 1945 |
| 2,401,379 | Smith | June 4, 1946 |
| 2,404,610 | Abell | July 23, 1946 |
| 2,420,556 | Mueller | May 13, 1947 |

FOREIGN PATENTS

| Number | Country | Date |
|---|---|---|
| 484,628 | Germany | 1929 |